United States Patent
Sprouse

(10) Patent No.: US 6,748,692 B2
(45) Date of Patent: Jun. 15, 2004

(54) SPINNER BAIT

(76) Inventor: Travis Sprouse, Rt. 1, Box 94, Stattsmills, WV (US) 25279

( * ) Notice: Subject to any disclaimer, the term of this patent is extended or adjusted under 35 U.S.C. 154(b) by 0 days.

(21) Appl. No.: 10/279,258

(22) Filed: Oct. 23, 2002

(65) Prior Publication Data

US 2003/0074828 A1 Apr. 24, 2003

Related U.S. Application Data

(60) Provisional application No. 60/336,026, filed on Oct. 23, 2001.

(51) Int. Cl.$^7$ ............................................. A01K 85/00
(52) U.S. Cl. ...................................... 43/42.13; 43/42.11
(58) Field of Search ............................. 43/42.13, 42.11

(56) References Cited

U.S. PATENT DOCUMENTS

| | | | | |
|---|---|---|---|---|
| 1,295,617 A | * | 2/1919 | Shannon | 43/42.4 |
| 1,734,883 A | * | 11/1929 | Shannon | 43/42.13 |
| 1,787,726 A | * | 1/1931 | Heddon et al. | 43/42.13 |
| 1,832,768 A | * | 11/1931 | Davenport | 43/42.13 |
| 1,923,840 A | * | 8/1933 | Ozburn | 43/42.13 |
| 1,997,802 A | * | 4/1935 | Meyer | 43/42.13 |
| 2,069,724 A | * | 2/1937 | Pflueger | 43/42.16 |
| 2,167,945 A | * | 8/1939 | Gilliam | 43/42.13 |
| 2,203,473 A | * | 6/1940 | Shannon | 43/42.06 |
| 2,235,331 A | * | 3/1941 | Pugh | 43/42.13 |
| 2,589,932 A | * | 3/1952 | Farley | 43/42.08 |
| 2,755,593 A | * | 7/1956 | Thurman | 43/44.2 |
| 3,747,256 A | * | 7/1973 | Haddock | 43/42.13 |
| 4,037,345 A | * | 7/1977 | Dubois | 43/42.13 |
| 5,524,378 A | | 6/1996 | Hood | 43/42.31 |
| 5,930,941 A | | 8/1999 | Hayes, II et al. | 43/42.13 |
| 5,956,886 A | * | 9/1999 | Choate | 43/42.13 |
| 6,018,901 A | * | 2/2000 | DuBois | 43/42.19 |
| 6,266,914 B1 | * | 7/2001 | Johnson et al. | 43/42.13 |
| 6,536,155 B1 | * | 3/2003 | VanRisseghem | 43/42.13 |

* cited by examiner

*Primary Examiner*—Joan M. Olszewski
(74) *Attorney, Agent, or Firm*—Steptoe & Johnson PLLC

(57) ABSTRACT

A spinner bait, including a head, a hook, a pair of legs, and two or more spinner blades extending from the pair of legs. The hook extends from the rearward end of the head. The legs each have a front end and a rearward end, and the front ends of the legs are connected to the front end of the head. The legs extend rearward over the top surface of the head and toward and around the hook. In so doing, the legs simulate the legs and/or body of a marine animal on which fish feed, and the legs also help conceal the hook and prevent its pointed end from getting snagged on objects under the surface of a body of water.

14 Claims, 1 Drawing Sheet

SPINNER BAIT

This application claims the benefit of Provisional application No. 60/336,026 filed Oct. 23, 2001.

BACKGROUND OF THE INVENTION

1. Field of the Invention

This invention relates to artificial fishing lures, and more specifically to spinner baits.

2. Related Art

Artificial fishing lures are available in a wide variety of types, however, an exceedingly popular type of fishing lure is called the "spinner bait." This type of fishing lure emphasizes the use of one or more spinner blades to increase the attractiveness of the lure to fish. The spinner blade is normally formed as a substantially separate part of the lure, that is, the typical spinner bait is formed of a wire body having two arms that extend in a V-shape with the fishing line or leader attached to the wire body at the intersection of the two arms. The two arms, usually formed of a single length of stainless steel wire, extend at an acute angle relative to each other. The typical spinner bait has a body secured to one of the arms and a fish hook extending rearwardly from the body. The other arm of the spinner bait has one or more spinner blades attached to it. The typical spinner bait is designed so that when it is pulled through the water the spinner arm is vertically positioned above the body arm. A fish is attracted to the moving lure by the dramatic effect caused by the rotating, flashing spinner blades that rotate above the lure body which is fixed to, or is a part of, the frame body arm.

Spinner baits have become exceedingly popular and have consumed, according to some reports, between about 40% to about 60% of the fresh water artificial bait market in the United States. The effectiveness of a spinner bait appears to reside in its ability to attract fish to the dressed hook. More specifically, the increased action, vibration, sound and flash produced by a spinner bait, compared to other types of artificial lures, seems to account for the spinner bait's success.

In addition to spinner baits that attract fish with rotating spinner blades, there are various other forms of artificial bait that attract fish due to their resemblance to naturally occurring fish foods, such as worms, minnows, crawdads, etc. These forms of artificial bait usually must be cast close to a fish in order for the fish to strike the bait because, unlike spinners that have spinning blades, these artificial lures have nothing to attract fish from a distance. Fish are very difficult to see when submersed in water, therefore it is very challenging, if not impossible, to cast an artificial lure close to a fish. Therefore, there is a need in the art for an artificial fishing lure that not only resembles a naturally occurring fish food, but that also contains a means for attracting fish to the lure from a distance.

A problem with spinner baits is that they often become tangled on weeds or twigs below the surface of a body of water. When fishing with a spinner bait, a common technique is to cast the spinner bait beyond a specific section of water in which it is believed that fish are present. The spinner bait is then reeled through that section of water in the hopes of getting a fish to strike the spinner bait. Oftentimes, the sections of water in which fish tend to congregate are also the sections of water containing the most plant growth, i.e., weeds. Thus, spinner baits tend to get "hung-up" in the sections of water which are most likely to be populated by fish. For that reason, there is a need in the art for an improved spinner bait that does not snag on undergrowth while simultaneously attracting fish.

An improved spinner bait is disclosed in U.S. Pat. No. 5,930,941 issues to Hayes et al. The invention disclosed in Hayes is a spinner bait having a triangular landing pattern which is formed by the nose of the lure and the outer ends of the arms which extend downwardly and rearwardly. As a result, an angle of between about 30 degrees to about 60 degrees is formed between the arms and the shank of the hook. The pointed end of the hook thus is kept above the bottom surface of the body of water. While this configuration purportedly prevents a spinner bait from snagging on the bottom surface of a body of water, it does nothing to prevent the hook from snagging on weeds, twigs, and/or other undergrowth beneath the surface of the water.

Conventional weed guards by themselves do not solve the problem, because in order for the weed guard to be effective it must be very close to the pointed end of the hook. So close, in fact, that the weed guard may decrease the likelihood of being able to set the hook in the mouth of a fish. When the weed guard is trimmed, thereby creating adequate room around the hook for setting the hook in the mouth of a fish, the weed guard is no longer effective at preventing the hook from snagging on undergrowth. Thus, there remains a need in the art for a realistic spinner bait that attracts fish, is easy to set in the mouth of a fish, and that prevents the hook of the spinner bait from snagging on undergrowth beneath the surface of the water.

SUMMARY OF THE INVENTION

The present invention solves the foregoing problems by providing a spinner bait with a "lifelike" appearance, an unobstructed hook for hooking fish, and a means for preventing the hook of the spinner bait from snagging on growth beneath the water.

An aspect of the invention is a spinner bait, including a head having a top surface, a bottom surface, a front end, a rearward end, and opposing sides, wherein the head lies in a horizontal plane; a hook having a shank, a curved portion, and a pointed end, wherein the hook extends from the rearward end of the head; two legs, each having a front end and a rearward end, wherein the front ends of the legs are connected to the front end of the head, and the legs extend rearwardly over the top surface of the head and toward the hook; and two spinner blades attached to and extending from the legs.

A feature of the invention is a hole or an eyelet adapted for receiving a fishing line, and positioned at the front end of the head.

Another feature of the invention is that the arms extend rearwardly from the head for a predetermined distance before diverging, thereby simulating the body and/or legs of a marine animal, such as a frog.

Another feature of the invention is that the spinner blades are connected to the arms behind the pointed end of the hook.

Another feature of the invention is that the arms and the head lie in about the same horizontal plane.

An advantage of the invention is its lifelike appearance which causes the spinner bait to effectively attract fish.

Another advantage of the invention is that the hook is prevented from snagging on undergrowth beneath the water surface by the legs which extend past and just to the sides of the pointed end of the hook.

Another advantage of the invention is that the hook is partially concealed by legs which extend rearwardly from the head and past the pointed end of the hook.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

EMBODIMENTS OF THE INVENTION

Figure 1:
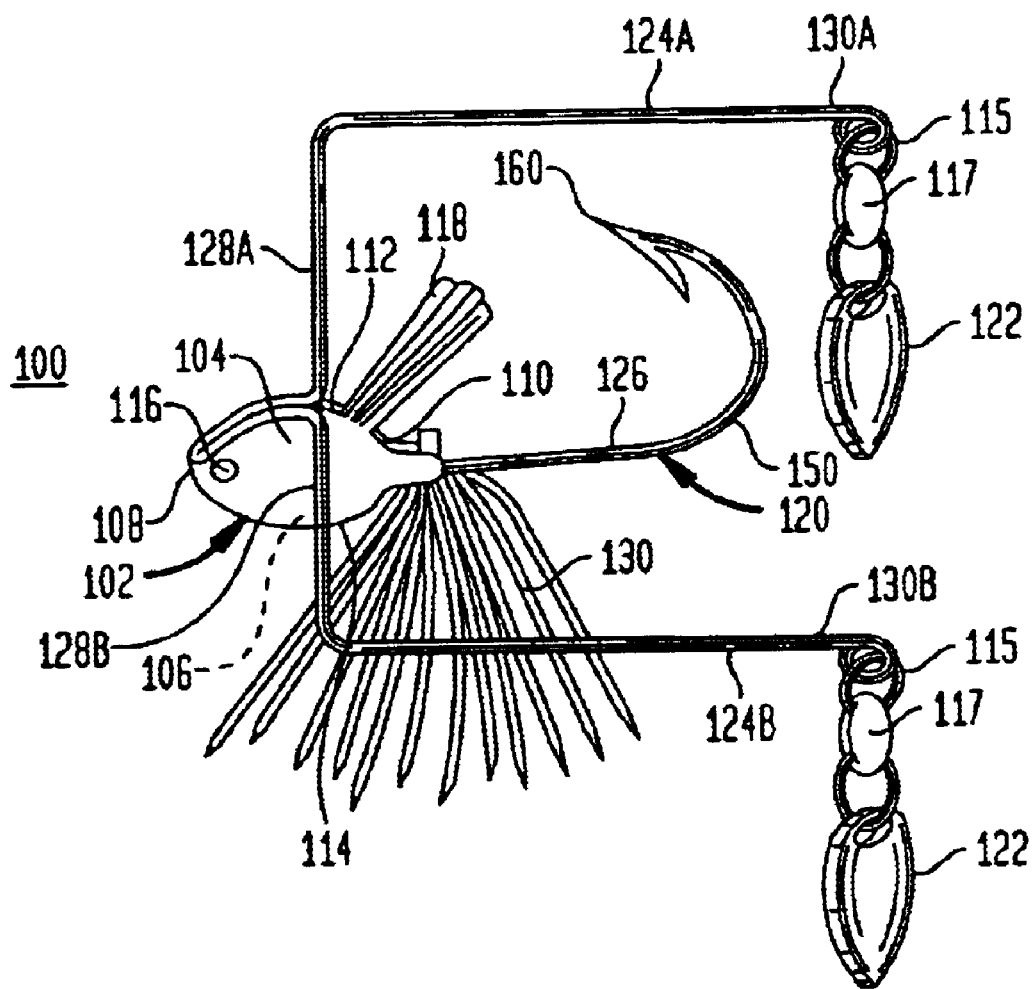
FIG. 1 is a perspective side elevational view of an embodiment of the spinner bait of the present invention.

An embodiment of a spinner bait 100 of the present invention is shown in FIG. 1. The spinner bait 100 includes a head 102, one or more legs 124A and 124B, a hook 120, and one or more spinner blades 122. The head 102 preferably resembles the head and/or body of insects or animals on which fish feed, e.g., frogs, crawdads, salamanders, smaller fish, etc. As such, the head 102 specifically, and the spinner bait 100 generally, may have any number of features, e.g., eyes, a mouth, or special colors or markings, for making the spinner bait 100 more closely resemble naturally occurring marine life. The head 102 preferably is weighted and may be made of lead, dense plastic, dense rubber, or other similar materials known to one of ordinary skill in the art.

The head 102 has a top surface 104, a bottom surface 106, a front end 108, a rearward end 110, and opposing sides 112, 114. At the front end 108 is a hole 116 for receiving a fishing line by which the spinner bait 100 is pulled through a body of water. Alternatively, an eyelet may be affixed to the front end 108 of the head 102 for receiving a fishing line.

A weed guard 118 optionally but preferably is connected to the rearward end 110 of the head 102, and extends upwardly and rearwardly therefrom. The weed guard 118 shields the hook 120 from weeds, brush, twigs, and other objects located under the water surface of a lake, pond, river, stream, or other body of water. The weed guard 118 preferably is formed of a bundle of closely-spaced segments of monofilament nylon bristle.

A skirt 130 optionally but preferably is attached to the head 102 of the spinner bait 100. The skirt 130 preferably is attached near the rearward end 110 of the head 102, but alternatively may be attached at various locations on the spinner bait 100. The skirt 130 helps to conceal the hook 120, and, along with the one or more spinner blades 122, helps to attract fish.

A hook 120 extends from the rearward end 110 of the head 102. The hook 120 includes a shank 126 and a curved portion 150 ending in a pointed end 160. A first end (not shown) of the shank 126 extends into the rearward end 110 and is secured to head 102. The shank 126 preferably extends straight back from the head 102, i.e., in the same horizontal plane in which the head 102 is situated. The hook 120 extends from the rearward end 110 of the head 102 such that the pointed end 160 of the hook 120 is above the shank 126 when the spinner bait 100 is pulled through water. This configuration of the hook 120, i.e., the pointed end 160 above the shank 126, helps prevent the hook 120 from snagging on the bottom surface of a lake, pond, river, stream, or other body of water.

Extending from the head 102 of the spinner bait 100 are one or more, preferably two, legs 124A and 124B, each having a front end 128A and 128B respectively, and each having a rearward end 130A and 130B respectively. In a preferred embodiment, the front ends 128A, 128B are connected to the front end 108 of the head 102, and the legs 124A, 124B extend rearwardly from the front end 108 toward the rearward end 110 of the head 102. The legs 124A and 124B preferably extend parallel to one another and are touching one another and the top surface 104 as they extend from the front end 108 of the head 102 toward the rearward end 110 of the head 102. At a point about halfway between the front end 108 and the rearward end 110, the legs 124A and 124B, which had been touching one another and extending parallel to one another, diverge. Each leg 124A, 124B preferably turns about 90 degrees outward and each extends beyond its respective opposing side 112, 114. After passing beyond their respective opposing sides 112, 114, the legs 124A, 124B preferably turn about 90 degrees rearward and extend beyond the curved portion 150 of the hook 120. The legs 124A, 124B extend from the front end 108 of the head 102 in about the same horizontal plane in which the head 102 rests. The legs 124A, 124B simulate the appearance of the legs of a frog or other food source for fish, thereby increasing the likelihood that a fish will strike the spinner bait 100. The legs 124A, 124B also prevent the hook 120 from snagging on undergrowth below the surface of the water.

The legs 124A, 124B preferably are formed from wire that is sufficiently rigid to support at least one spinner blade 122. The legs preferably are formed from titanium wire, but alternatively may be made from other materials such as, but not limited to stainless steel or other materials known to one of ordinary skill in the art. Each leg 124A, 124B preferably ends in a loop 115 adapted for receiving one or more spinner blades 122. The one or more spinner blades 122 preferably are attached to each of the loops 115 of the arms 124A, 124B by one or more swivels 117.

In operation, the spinner bait 100 is secured to a fishing line by inserting the fishing line through hole 116 and tying a knot in the fishing line. The spinner bait 100 then is cast into the water and allowed to drop to a desired depth below the water surface. Once the spinner bait 100 reaches the desired water depth, the spinner bait 100 is retrieved by operating the reel attached to the fishing rod. During retrieval, the fishing line pulls the spinner bait 100 head 102 first through the water causing water to flow over the spinner bait 100 including the spinner blades 122. The water flow causes the spinner blades 122 to rotate and attract fish. The spatial relationship of the head 102 and the legs 124A, 124B further attracts fish because the legs 124A, 124B simulate the body and/or legs of small marine animals on which fish feed. Having the spinner blades 122 attached to the rearward end of the legs helps to draw attention to the legs 124A, 124B specifically and the spinner bait 100 in general.

When the spinner bait 100 is pulled through a section of water containing weeds or twigs, the legs 124A, 124B, along with the weed guard 118, prevent the spinner bait 100 from getting "hung-up." Because the legs 124A, 124B extend rearward over the top surface 104 of the head 102, diverge at about the mid-point between the front end 108 and the rearward end 110 of the head 102, and extend rearwardly and to the sides of the pointed end 160 of the hook 120, the legs 124A, 124B conceal the hook 120 from objects on which it may otherwise snag. The legs 124A, 124B thus serve a dual purpose. First, they help create a lifelike appearance for the spinner bait 100 by simulating the appearance of legs on marine life. Second, because of their location above the head 102 and their extension around the hook 120, the legs 124A, 124B help prevent the spinner bait 100 from snagging on objects in the water.

CONCLUSION

While various embodiments of the present invention have been described, it should be understood that they have been presented by the way of example only, and not limitation. It will be understood by those skilled in the art that various changes in form and details may be made therein without departing from the spirit and scope of the invention. Thus, the breadth and scope of the present invention should not be limited by any of the above-described exemplary embodiments, but should be defined in accordance with the described terms and their equivalents.

What is claimed is:

1. A spinner bait, comprising:
   a head having a top surface, a bottom surface, a front end, a rearward end, and opposing sides, wherein said head lies in a horizontal plane;
   a hook having a shank, a curved portion, and a pointed end, said hook extending from said rearward end of said head;
   two legs, each having a front end and a rearward end, wherein said front ends of said legs are connected to said front end of said head, said legs extend rearward over said top surface of said head and toward said hook, and a section of said legs extending from the front end of said head along said top surface of said head are in contact with said top surface of said head as said legs extend rearwardly toward said hook; and
   two spinner blades attached to and extending from said legs.

2. The spinner bait of claim 1, further comprising a skirt attached to said head.

3. The spinner bait of claim 1, further comprising a weed guard connected to said rearward end of said head, and extending upwardly and rearwardly therefrom.

4. The spinner bait of claim 1, wherein said shank of said hook extends from said rearward end of said head in about the horizontal plane in which said head lies.

5. The spinner bait of claim 1, wherein said pointed end of said hook lies in a horizontal plane above the horizontal plane in which said head lies.

6. The spinner bait of claim 1, wherein each of said rearward ends of said legs forms a loop adapted for receiving said spinner blades.

7. The spinner bait of claim 1, wherein said legs are parallel to one another while said section of said legs are in contact with said top surface of said head.

8. The spinner bait of claim 1, wherein said legs are touching one another while said section of said legs are in contact with said top surface of said head.

9. The spinner bait of claim 1, wherein said legs diverge at about a midpoint between said front end of said head and said rearward end of said head.

10. The spinner bait of claim 9, wherein said legs diverge at about a 90 degree angles.

11. The spinner bait of claim 10, wherein said legs extend outwardly beyond said opposing sides of said head.

12. The spinner bait of claim 11, wherein said legs turn about 90 degrees rearward and extend beyond said curved portion of said hook.

13. The spinner bait of claim 1, wherein said spinner blades are connected to said legs by swivels.

14. The spinner bait of claim 1, further comprising a hole adapted for receiving a fishing line, said hole being situated in said front end of said head.

* * * * *